United States Patent
Mehedi et al.

(10) Patent No.: US 11,370,675 B1
(45) Date of Patent: Jun. 28, 2022

(54) REMOVAL OF AMMONIACAL NITROGEN FROM LANDFILL LEACHATES

(71) Applicant: King Abdulaziz University, Jeddah (SA)

(72) Inventors: Ibrahim Mustafa Mehedi, Jeddah (SA); Shahrul bin Ismail, Terengganu (MY); Mohamed Shahrir Mohamed Zahari, Terengganu (MY); Ubaid M. Al-Saggaf, Jeddah (SA); Md Mottahir Alam, Jeddah (SA); Ahmed Ubaid Al-Saggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/580,282

(22) Filed: Jan. 20, 2022

(51) Int. Cl.
*C02F 1/52* (2006.01)
*C02F 1/42* (2006.01)
*C02F 1/20* (2006.01)
*C02F 101/20* (2006.01)
*C02F 103/06* (2006.01)

(52) U.S. Cl.
CPC .............. *C02F 1/5254* (2013.01); *C02F 1/20* (2013.01); *C02F 1/42* (2013.01); *C02F 1/5209* (2013.01); *C02F 1/5245* (2013.01); *C02F 2001/425* (2013.01); *C02F 2101/20* (2013.01); *C02F 2101/203* (2013.01); *C02F 2101/206* (2013.01); *C02F 2103/06* (2013.01); *C02F 2209/14* (2013.01)

(58) Field of Classification Search
CPC ................................................... C02F 1/5254
See application file for complete search history.

(56) References Cited

U.S. PATENT DOCUMENTS

| | | | |
|---|---|---|---|
| 4,228,003 A | 10/1980 | Makino | |
| 7,264,715 B2 | 9/2007 | Hagino et al. | |
| 10,259,735 B1* | 4/2019 | Bader | C02F 9/00 |
| 2011/0315631 A1* | 12/2011 | Al-Samadi | C02F 9/04 210/636 |
| 2016/0228795 A1* | 8/2016 | St. John et al. | B01D 21/02 |
| 2018/0297873 A1* | 10/2018 | Huddersman et al. | C02F 1/72 |

FOREIGN PATENT DOCUMENTS

| | | |
|---|---|---|
| CN | 103641283 B | 1/2016 |
| DE | 10 2005 040 018 B4 | 5/2014 |
| JP | 2013-230414 | 11/2013 |
| KR | 10-2017-0101533 | 9/2017 |

OTHER PUBLICATIONS

Li, et al.; MAP Precipitation from Landfill Leachate and Seawater Bittern Waste; Environmental Technology 23:9; pp. 989-1000; May 11, 2010; 13 Pages.

Lahav, et al.; Struvite recovery from municipal-wastewater sludge centrifuge supernatant using seawater NF concentrate as a cheap Mg(II) source; Separation and Purification Technology 108; pp. 103-110; Feb. 11, 2013; 9 Pages.

Zahari, et al.; Potential Use of Sea Water in Leachate Physico-Chemical Treatment: Process Performance and Struvite Formation; International Conference on Sustainable Development and Livelihoods (ICSDL 2016); 8 Pages.

* cited by examiner

*Primary Examiner* — Peter Keyworth

(74) *Attorney, Agent, or Firm* — Oblon, McClelland, Maier & Neustadt, L.L.P.

(57) ABSTRACT

A method of treating a landfill leachate containing ammoniacal nitrogen and phosphate by mixing with seawater to precipitate magnesium ammonium phosphate (MAP) also known as struvite. Effects of pH, temperature, stirring speed, and magnesium to ammonia molar ratio on leachate properties such as COD, ammoniacal nitrogen, phosphate content, color, turbidity, amount of magnesium, iron and zinc are disclosed. The method provides high removal efficiency for removal of ammoniacal nitrogen, phosphate, COD, color and turbidity. The method provides a cost-effective system for treatment of landfill leachate and recovery of MAP.

18 Claims, No Drawings

REMOVAL OF AMMONIACAL NITROGEN FROM LANDFILL LEACHATES

BACKGROUND

Technical Field

The present invention is related to a method for treatment of landfill leachate and for obtaining useful materials therefrom. The present invention relates to a method of treating a landfill leachate containing ammoniacal nitrogen and phosphate by mixing with seawater to precipitate magnesium ammonium phosphate (MAP), also known as struvite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Landfilling is the most commonly used waste disposal system in many countries because of its simplicity, minimal required ongoing supervision, technical feasibility, and low cost [Kamaruddin, M. A., et. al., Applied Water Sciences, 2015, 5, 113-126 and Aziz, S. Q., et. al., J Environment Management, 2010, 91, 2608-2614]. However, landfills have a huge drawback in that each requires a very large site. Further, ideal sites must have specific geographic, hydrologic, or geologic properties. The availability of such areas is becoming limited due to factors such as increasing population and urban and suburban expansion. Due to the undesirable nature of living near a landfill, the area allocated for landfill is being pushed away from populated areas. In some places landfills are being located nearer to coastal areas. This has the potential to cause undesirable environmental consequences stemming from contamination of the coastal water by leachate or leachate infiltration into land surface water and groundwater. Further, coastal areas are more prone to flooding, decreasing the viability of time-intensive leachate treatment methods or evaporation to solid. To properly manage leachate in such areas, as well as effectively prevent contamination of surrounding water bodies, leachate should be removed from landfills and treated such that the decontaminated water may be returned to the environment.

The chemical constituents present in landfill leachate are generated by the degradation of solid waste in the landfill. The quantity and composition of the landfill leachate are affected by several factors including waste from water percolation, biochemical process in wastes, and the degree of waste compaction [Abbas, A. A., et. al., American Journal of Applied Sciences, 2009, 6, 4, 672-684]. Further, the age of landfill contributes to differences in compositions of landfill leachate. A young leachate (that is, leachate from a landfill 1-2 years old) is characterized by high organic fraction of relatively low molecular weight volatile organic acids, high chemical oxygen demand (COD), total organic carbon (TOC), BOD5 and a BOD5/COD>0.6 [Umar, M., et. al., Waste management, 2010, 30, 11, 2113-2121]. Usually, landfills which are more than 10 years old are characterized by relatively low chemical oxygen demand (COD), e.g., less than 4,000 mg/L, a slightly basic pH, e.g., more than 7.5 and a low biodegradability (BOD5/COD<0.1) [Li, W, et. al., Desalination, 2010, 264, 56-62]. Generally, there is a wide variation of semi-aerobic and anaerobic landfill leachate composition in terms of leachate parameters indicating that aeration process plays a significant role in reducing the concentration of several contaminants.

Within leachate, ammoniacal nitrogen is one of the major pollutants that must be removed prior to release into the environment. Ammoniacal nitrogen concentration in leachates varies from hundreds to thousands of milligrams per liter depending on the factors such as the age of the landfill, solid waste types and loadings, landfill site meteorological, geological, and hydrological conditions, and others. In most situations, the ammoniacal nitrogen concentration tends to increase substantially with the age of the landfill because of the advanced degradation of biological compounds which give rise to ammonia in leachate. Various types of treatments including biological, physical, chemical, and physico-chemical techniques have been explored for the removal of ammoniacal nitrogen.

The most common method for removing ammoniacal nitrogen from landfill leachate is nitrification-denitrification, typically performed as part of activated sludge treatment. Activated sludge plants, which typically treat carbon-based contaminants, often discharge ammonia as an effluent not only as an unresolved constituent of wastewater but also as a byproduct of the treatment process itself. Typically, the concentration of the domestic wastewater ammonia treated in activated sludge process is in the range from 10 to 50 mg N/L. Biological nitrification-denitrification has the potential to mitigate this ammonia release by converting the ammonia to nitrate, then removing the nitrate. However, nitrification-denitrification reactor conditions must be conducive to the growth and activity of both heterotrophic and nitrifying bacteria for simultaneous carbon and ammonia oxidation to occur. Factors including sludge age (Mean Cell Residence Time (MCRT)), pH, temperature, dissolved oxygen (DO) concentration, electron donor substrate concentration, substrate composition, loading rate, and the presence of toxic substances are considered relevant to the growth and activity of heterotrophs and to nitrifiers.

Conventional nitrification-denitrification processes are unable to effectively remove the high levels of ammoniacal nitrogen present in landfill leachate, and the decrease of other readily biodegradable compounds in the leachate limits the ability of microbes to mitigate nitrogen-containing compounds in other ways. These methods also require high energy for aeration. Short-cut nitrification/denitrification and anaerobic ammonium oxidization are other biological techniques that have shown promise in solving the above problems. However, the results have shown that these related biological treatments are also negatively affected by high concentration of ammonium-nitrogen in leachate. Also, chemical precipitation of ammoniacal nitrogen as pre-treatment to biological treatment has shown to cause a decrease in efficiency of COD removal and the dehydrogenase activity while the $NH_4^+$ concentration increased [Li, X. Z., et. al., Chemosphere, 2001, 44, 37-43]. Therefore, it is not possible to constantly control the nitrification-denitrification process to the required degree in high ammonia leachates. Further, these nitrification-denitrification processes decrease the efficiency of other necessary leachate treatment steps, dramatically limiting their utility.

A promising route to the removal of ammoniacal nitrogen is chemical treatment through the formation of Magnesium-Ammonia-Phosphate (MAP). MAP, also known as struvite, precipitation is able remove ammonia by effectively trapping it inside a solid precipitate that can be easily separated from the leachate solution. The struvite is a white insoluble crystalline compound produced from the treatment reaction shown in the equation below:

$$Mg^{2+}(aq) + NH_4^+(aq) + HPO_4^{3-}(aq) + OH^-(aq) + 5H_2O \rightarrow MgNH_4PO_4 \cdot 6H_2O \downarrow \quad (1)$$

MAP precipitation has proven effective for treating wastewater having high ammonia content [Crutchik, D. & Garrido, J. M., Water Sci Technol., 2011, 64, 12, 2460-7; and Kumashiro K., Ishiwatari H and Nawamura Y., Second International Conference on Recovery of Phosphates from sewage and animal wastes. 12-13 Mar. 2001. Noordwijkerhout, Holland] and also from landfill leachate [Camargo, C., et. al., Water S A, 2014, 40, 3, 491-494; Di Iaconi, et. al., Bioresource technology, 2010, 101,6, 1732-1736; Huang, H., et. al., J Environ Management, 2014, 145, 191-8; and Xiu-Fen, L., et. al., Environmental Chemistry Letters, 2011, 9, 1, 71-75] using various chemical additives as the magnesium and/or phosphate source. Additionally, struvite has potential as a slow release biofertilizer. The main disadvantage of these processes is the requirement of high-grade additive chemicals needed to react with ammoniacal nitrogen. It is estimated that about 75% of the operation cost of MAP precipitation treatment of leachate is the use of high-grade magnesium sources [Kataki, S., et. al., Conservation and Recycling, 2006, 107, 142-156]. Furthermore, the use of pure compounds and transportation of these chemicals for the treatment is costly and dramatically increases the risk of environmental contamination. Additionally, the leachate may contain heavy metals that are toxic to plants and/or animals and prevent the use of MAP precipitate from landfill leachate as a fertilizer. However, the use of surrounding resources such as seawater would be of great advantage for both operational and transportation costs. For example, seawater can serve as a reliable source of magnesium, particularly in landfills near coastal areas. Further, seawater could be used in sufficient amounts so as to sufficiently dilute heavy metals in the leachate without contaminating the MAP.

The use of seawater as a substitute source of magnesium in leachate treatment via Magnesium Ammonium Phosphate (MAP) precipitation process was previously investigated [M. Shahrir, and M. Zahari, S. I., Potential Use of Sea Water In Leachate Physicochemical Treatment: Process Performance And Struvite Formation. International Conference on Sustainable Development and Livelihoods, ICSDL 2016, Malaysia, which is incorporated herein by reference in its entirety]. A series of batch studies were carried out for the MAP precipitation in the laboratory using a mixture of seawater and leachate but did not lead to a practical and effective treatment method. In order to address the shortcomings of prior work the present disclosure describes a process that utilizes seawater effectively in combination with MAP.

SUMMARY

The present invention relates to a method of treating a landfill leachate containing ammoniacal nitrogen and phosphate by mixing with seawater to precipitate magnesium ammonium phosphate (MAP), also known as struvite.

In an exemplary embodiment, a method of removing ammoniacal nitrogen from a landfill leachate is described. The method comprises adding oxalic acid to seawater from a depletion solution having an oxalic acid concentration of 0.01 to 0.25 M, precipitating a first precipitate comprising calcium oxalate to form a depleted seawater, adding a phosphate source to the depleted seawater to form a supplemented seawater, mixing the supplemented seawater with a landfill leachate having an ammoniacal nitrogen content of 100 to 10,000 mg/L to form a reaction mixture having a molar ratio of $Mg^{2+}$ to $NH_4^+$ of 1:1 to 1:5, adjusting the pH of the reaction mixture to 7.5 to 11.0 to form an adjusted reaction mixture, aging, for 10 to 120 minutes, the adjusted reaction mixture to form a treated leachate and a second precipitate comprising magnesium ammonium phosphate, and separating the second precipitate and the treated leachate, wherein the second precipitate is substantially free of calcium.

In some embodiments, the method further comprises removing the first precipitate from the depleted sweater.

In some embodiments, the method further comprises measuring the ammonia concentration in the landfill leachate and calculating a volumetric mix ratio of landfill leachate to supplemented seawater.

In some embodiments, the method further comprises adding a second precipitate seed solid to the reaction mixture.

In some embodiments, the second precipitate seed solid comprises magnesium ammonium phosphate.

In some embodiments, the method further comprises adding a coagulation aid to the reaction mixture.

In some embodiments, the coagulation aid is an iron halide.

In some further embodiments, the iron halide is ferric chloride.

In some embodiments, the method further comprises adding a precipitation inhibitor to the reaction mixture.

In some embodiments, the precipitation inhibitor is boric acid.

In some embodiments, the method comprises contacting the landfill leachate with a cation exchange resin prior to mixing with supplemented seawater.

In some embodiments, the contact with the cation exchange resin reduces a metal ion concentration of the landfill leachate by at least 50% of an initial metal ion concentration.

In some embodiments, the metal ion is at least one selected from the group consisting of manganese, calcium, cadmium, zinc, and iron.

In some embodiments, the landfill leachate is contacted with the cation exchange resin in an amount of 0.01 to 1 g cation exchange resin per mL of landfill leachate.

In some embodiments, the method removes at least 90% of an initial amount of ammoniacal nitrogen present in the landfill leachate.

In some embodiments, the aging is performed for 20 to 90 minutes.

In some embodiments, the aging is performed with stirring.

In some embodiments, the aging is performed at 20 to 50° C.

In some embodiments, the method further comprises, prior to the mixing, demethanizing the landfill leachate.

The foregoing general description of the illustrative embodiments and the following detailed description thereof are merely exemplary aspects of the teachings of this disclosure and are not restrictive.

DETAILED DESCRIPTION

The terms "approximately," "approximate," "about," and similar terms generally refer to ranges that include the identified value within a margin of 20%, 10%, or preferably 5%, and any values therebetween.

As used herein, the term "seawater" refers to any suitable saline water or salt water having a salinity of at least 0.05%. The term "seawater" may be used to refer to such salt water from a sea, ocean, or any portion thereof such as a gulf, bay, or strait. It should be understood that as used herein, the term seawater is to include brackish water, i.e., water having a salinity of 0.05 to 3%. Salinity may be measured as a weight %.

As used herein, the phrase "substantially free", unless otherwise specified, describes a particular component being present in an amount of less than about 1 wt %, preferably less than about 0.5 wt %, more preferably less than about 0.1 wt %, even more preferably less than about 0.05 wt %, even more preferably less than about 0.01 wt %, even more preferably less than about 0.001 wt %, yet even more preferably 0 wt %, relative to a total weight of the composition being discussed.

The present invention relates to a method of treating a landfill leachate containing ammoniacal nitrogen and phosphate by mixing with seawater to precipitate magnesium ammonium phosphate (MAP), also known as struvite.

In an exemplary embodiment, a method of removing ammoniacal nitrogen from a landfill leachate is provided.

The method comprises adding oxalic acid to seawater to form a depletion solution, precipitating a first precipitate comprising calcium oxalate to form a depleted seawater, adding a phosphate source to the depleted seawater to form a supplemented seawater, mixing the supplemented seawater with a landfill leachate to form a reaction mixture having a molar ratio of $Mg^{2+}$ to $NH^{4+}$ of 1:1 to 1:5, preferably 1:1.25 to 1:4.5, preferably 1:1.5 to 1:4, preferably 1:1.75 to 1:3.5, preferably 1:2 to 1:3, preferably 1:2.1 to 1:2.5, preferably 1:2.25, adjusting the pH of the reaction mixture to 7.5 to 11, preferably 8 to 10.5, preferably 8.5 to 10, preferably 9 to 9.5 to form an adjusted reaction mixture, aging, for 10 to 120 minutes, the adjusted reaction mixture to form a treated leachate and a second precipitate comprising magnesium ammonium phosphate, and separating the second precipitate and the treated leachate.

The addition of oxalic acid to seawater provides the advantage of $Ca^{2+}$ removal via calcium oxalate precipitation, as shown in the equations below:

$$H_2C_2O_4 \leftrightarrow C_2O_4^{2-}+2H^+ \tag{2}$$

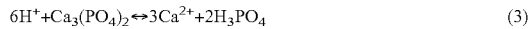
$$6H^+ + Ca_3(PO_4)_2 \leftrightarrow 3Ca^{2+} + 2H_3PO_4 \tag{3}$$

$$Ca^{2+} + C_2O_4^{2-} \leftrightarrow CaC_2O_4 \downarrow \tag{4}$$

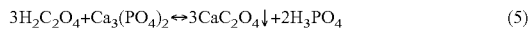
$$3H_2C_2O_4 + Ca_3(PO_4)_2 \leftrightarrow 3CaC_2O_4 \downarrow + 2H_3PO_4 \tag{5}$$

In some embodiments, the method comprises adding oxalic acid to the leachate. Being an organic acid, oxalic acid may cause dissolution of metal-comprising materials in the leachate. Specifically, the acid may dissolve suspended or precipitated metal phosphates in the landfill leachate as shown in the exemplary equations below where M represents a metal:

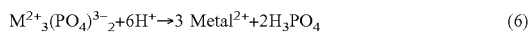
$$M^{2+}_3(PO_4)^{3-}_2 + 6H^+ \rightarrow 3\ Metal^{2+} + 2H_3PO_4 \tag{6}$$

or

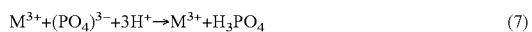
$$M^{3+} + (PO_4)^{3-} + 3H^+ \rightarrow M^{3+} + H_3PO_4 \tag{7}$$

In this way, the oxalic acid can increase the phosphate concentration available for MAP formation in the leachate. Additionally, the oxalic acid may dissolve magnesium-comprising solids, such as MgO, $Mg(OH)_2$, or $MgCO_3$, thereby increasing the magnesium ion concentration available for MAP formation. Addition of oxalic acid to the leachate, however, has the possibility of increasing concentration of undesirable metals such as calcium or heavy metals. The presence of such undesirable metals may make a contaminated MAP that is undesirable for use as fertilizer. However, many heavy metal oxalate complexes are insoluble in water and may form precipitates as shown in the exemplary equations below where M represents a metal:

$$M^{2+} + C_2O_4^{2-} \leftrightarrow MC_2O_4 \downarrow \tag{8}$$

or

$$2M^{3+} + 3C_2O_4^{2-} \leftrightarrow M_2(C_2O_4)_3 \downarrow \tag{9}$$

The depletion solution has an oxalic acid concentration of 0.01 to 0.25 M, preferably 0.015 to 0.20 M, preferably 0.02 to 0.175 M, preferably 0.025 to 0.15 M, preferably 0.03 to 0.125 M, preferably 0.035 to 0.10 M, preferably 0.04 to 0.075 M, preferably 0.045 to 0.06 M, preferably 0.05 M.

In general, the oxalic acid may be added in any suitable form and/or by any suitable technique known to one of ordinary skill in the art. For example, the oxalic acid may be added as a solid or as a solution. The adding may involve concurrent aeration of the seawater, for example by bubbling, gas injection, or surface agitation of the seawater. Such a solution may comprise oxalic acid dissolved in a suitable solvent, preferably water. The water may be freshwater or seawater. Preferably, the solution is substantially free of organic solvents. Examples of organic solvents include, but are not limited to diethyl ether, tetrahydrofuran, acetonitrile, acetone, N,N-dimethylformamide, dimethylsulfoxide, pentane, hexanes, cyclohexane, benzene, toluene, chloroform, dichloromethane, ethyl acetate, ammonia, t-butanol, n-butanol, n-propanol, 2-propanol, ethanol, and methanol. The presence of such organic solvents may be disadvantageous for the method of the present disclosure. For example, organic solvents may serve to interfere with MAP precipitation when seawater to which an organic solvent has been added is mixed with seawater. The oxalic acid may be dissolved in the solution at any suitable concentration. Preferably, the concentration of oxalic acid in the solution is sufficiently high so as to the calcium concentration in the depletion solution to differ from the calcium concentration in the seawater by less than 10%, preferably by less than 7.5%, preferably by less than 5%, preferably by less than 4.5%, preferably by less than 4.0%, preferably by less than 3.5%, preferably by less than 3.0%, preferably by less than 2.5%, preferably by less than 2.0%, preferably by less than 1.5%, preferably by less than 1.0%. The solution may comprise oxalic acid dissolved in water in an amount of 90 to 320 g/L, preferably 95.5 to 315 g/L, preferably 100 to 300 g/L, preferably 105 to 290 g/L, preferably 110 to 275 g/L, preferably 115 to 260 g/L, preferably 120 to 250 g/L, preferably 125 to 240 g/L, preferably 130 to 230 g/L, preferably 135 to 220 g/L preferably 139 to 217 g/L.

The first precipitate comprises calcium oxalate. In some embodiments, the first precipitate further comprises magnesium oxalate. In some embodiments, the first precipitate comprises barium oxalate. In some embodiments, the first precipitate comprises strontium oxalate. In some embodiments, the first precipitate comprises one or more transition metal oxalates. Example of transition metal oxalates include, but are not limited to iron (II) oxalate, aluminum oxalate, nickel oxalate, molybdenum oxalate, cobalt (II) oxalate, cadmium oxalate, and zinc oxalate.

The addition of oxalic acid to the landfill leachate may form a third precipitate. The third precipitate may comprise at least one metal oxalate complex selected from the group consisting of calcium oxalate, barium oxalate, strontium oxalate, magnesium oxalate, and a transition metal oxalate as described above.

In some embodiments, the method further comprises removing the first precipitate from the depleted seawater. In general, the first precipitate may be removed by any suitable technique known to one of ordinary skill in the art. Examples of such suitable techniques include, but are not limited to decantation, centrifugation, and filtration, but excluding techniques such as evaporation and distillation. Similarly, the separating of the magnesium ammonium phosphate and the treated leachate may be performed by any such suitable technique.

In some embodiments, the depleted seawater has a calcium content of less than 75%, preferably less than 70%, preferably less than 65%, preferably less than 60%, preferably less than 55%, preferably less than 50%, preferably less than 45%, preferably less than 40%, preferably less than 35%, preferably less than 30%, preferably less than 25%, preferably less than 20%, preferably less than 15% preferably less than 12.5%, preferably less than 10% preferably less than 7.5%, preferably less than 5% preferably less than 2.5%, preferably less than 1% of an initial calcium content of the seawater, based on a number of moles. Removal of calcium from seawater may be advantageous for producing a magnesium ammonium phosphate precipitate which is substantially free of calcium.

The phosphate source may be any suitable phosphate-comprising material known to one of ordinary skill in the art. Examples of such suitable phosphate-comprising materials include, but are not limited to phosphoric acid (also referred to as orthophosphoric acid); pyrophosphoric acid; triphosphoric acid; orthophosphate salts (also referred to as tribasic phosphate salts) such as sodium phosphate (also known as trisodium phosphate), ammonium phosphate, and potassium phosphate; hydrogen phosphate salts (also referred to as dibasic phosphate salts) such as sodium hydrogen phosphate (also called disodium phosphate or disodium hydrogen phosphate), potassium hydrogen phosphate (also known as dipotassium hydrogen phosphate), and ammonium hydrogen phosphate; dihydrogen phosphate salts (also referred to as monobasic phosphate salts) such as sodium dihydrogen phosphate, potassium dihydrogen phosphate, and ammonium dihydrogen phosphate; pyrophosphate salts such as disodium pyrophosphate (also known as sodium acid pyrophosphate) and tetrasodium pyrophosphate (also known as sodium pyrophosphate and tetrasodium phosphate); trimetaphosphate salts such as sodium trimetaphosphate; hexametaphosphate salts such as sodium hexametaphosphate; and bonemeal. While the above salts may be salts of alkaline earth metals or transition metals, preferably they are not. For example, the addition of calcium phosphate would increase the calcium content of the supplemented seawater, disadvantageous in that a major objective of forming the depleted seawater is to lower the calcium concentration.

In general, the phosphate source may be added in any suitable form and/or by any suitable technique known to one of ordinary skill in the art. For example, the phosphate source may be added as a solid or as a solution. The adding may involve concurrent aeration of the depleted seawater, for example by bubbling, gas injection, or surface agitation of the depleted seawater. The solution may be as described above. In some embodiments, the phosphate source is added in a suitable amount such that the reaction mixture has a molar ratio of $Mg^{2+}$ to phosphate of 1:1 to 1:5, preferably 1:1.25 to 1:4.5, preferably 1:1.5 to 1:4, preferably 1:1.75 to 1:3.5, preferably 1:2 to 1:3, preferably 1:2.1 to 1:2.5, preferably 1:2.25. In some embodiments, the phosphate source is added in a suitable amount such that the reaction mixture has a molar ratio of $NH_4^+$ to phosphate of 0.5:1 to 1.5:1, preferably 0.6:1 to 1.4:1, preferably 0.7:1 to 1.3:1, preferably 0.75:1 to 1.25:1, preferably 0.80:1 to 1.20:1, preferably 0.85:1 to 1.15:1, preferably 0.90:1 to 1.10:1, preferably 0.95:1 to 1.05:1, preferably 1:1.

In general, the adjusting of the pH may be achieved by addition of any suitable acid and/or base known to one of ordinary skill in the art. While amine bases may be used, preferably they are not. The addition of amine bases may be disadvantageous for reasons such as inability to reach the target pH, a large amount of amine base required to reach the target pH, or an increasing the ammoniacal nitrogen in the reaction mixture. Preferably, the adjusting of the pH is achieved by addition of a hydroxide base. Examples of such suitable hydroxide bases include sodium hydroxide, potassium hydroxide, lithium hydroxide, and magnesium hydroxide, but excluding ammonium hydroxide. The use of ammonium hydroxide may be disadvantageous for increasing the concentration of ammoniacal nitrogen in the reaction mixture. In some embodiments, acid must be added in order to adjust the pH. In such embodiments, any suitable acid may be used, such as hydrochloric acid, sulfuric acid, phosphoric acid, nitric acid, lactic acid, acetic acid, and formic acid. The use of phosphoric acid may be particularly advantageous for the simultaneous pH adjusting and phosphate supplementing. In general, the acid and/or base may be added in any suitable form, for example as a solid, a neat liquid, or a solution. The solution may be as described above.

The landfill leachate may be any suitable landfill leachate. That is, the leachate may be a young leachate (i.e. obtained from a landfill less than 5 years in age), an intermediate leachate (i.e. obtained from a landfill 5 to 10 years in age), or an old leachate (i.e. obtained from a landfill greater than 10 years in age). The landfill leachate may be collected in any suitable manner or using any suitable equipment known to one of ordinary skill in the art. In some embodiments, the landfill leachate is collected from a contaminated groundwater. In landfills which lack a liner or dedicated leachate collection system, leachate may enter groundwater in the area of the landfill or hydrologically downstream from the landfill. In such situations, groundwater which has been contaminated with the landfill leachate may be collected and treated by the method of the present disclosure, the contained groundwater being referred to as the leachate. In preferred embodiments, the landfill leachate is collected from a leachate collection system. A leachate collection system typically has a landfill liner and a leachate drainage system. The liner is typically a water-impermeable layer which presents the leachate from flowing out of the landfill or the leachate collection system. The liner may comprise geomembranes, geosynthetic clay liners, geotextiles, geogrids, geonets, and/or geocomposites. The leachate drainage system is responsible for the collection and transport of the leachate collected inside the liner. The leachate drainage system may comprise pipes, pumps, sumps, wells, filters, valves, bypasses, and the like designed to passively or actively remove leachate which is formed in the landfill and captured by the liner. Some leachate collection systems comprise an evaporation apparatus, such as a tank or pond. The evaporation apparatus may be useful for concentrating the leachate or allowing the escape of dissolved gas. In some embodiments, the landfill leachate used in the method of the present disclosure has been concentrated and/or degassed by aging in an evaporation apparatus. Preferably, the landfill leachate is collected from a landfill side of the liner present in a leachate collection system. Such a landfill leachate may be removed from the landfill by pumping or draining from the landfill itself using the drainage system described above. The landfill leachate may thus be treated before it contacts groundwater to cause contamination.

In some embodiments, the method further comprises demethanizing the landfill leachate. Such demethanizing may form a "demethanized leachate". Such demethanizing should be performed before mixing the leachate with the supplemented seawater. The presence of dissolved methane in the leachate may be dangerous to personnel performing the method or create an explosion hazard in a facility where the method is being performed. The demethanizing may be referred to as "methane stripping". In general, the demethanizing may be performed using any suitable technique known to one of ordinary skill in the art. In some embodiments, a suitable gas is bubbled through a methane-comprising leachate. Examples of suitable gas include, but are not limited to, air, carbon dioxide, nitrogen, helium, argon, and mixtures thereof. In some embodiments, the leachate mixed or agitated so as to introduce ambient atmosphere into the leachate. Such mixing or agitation may be performed, for example, by an aerator or by cascading the leachate in the presence of ambient atmosphere. In some embodiments, the demethanizing is performed by biological methane stripping. Typically, biological methane stripping involves aerobic digestion by bacteria. The aerobic digestion may be performed in a suitable digestion apparatus, such as a membrane bioreactor, a sequencing batch reactor, a fixed bed reactor, or a biofilter. In preferred embodiments, the demethanizing produces a demethanized leachate having a dissolved methane concentration less than 0.14 mg/L, preferably less than 0.12 mg/L, preferably less than 0.10 mg/L, preferably less than 0.08 mg/L, preferably less than 0.06 mg/L, preferably less than 0.04 mg/L.

The landfill leachate has an ammoniacal nitrogen content of 100 to 10,000 mg/L, preferably 125 to 9000 mg/L, preferably 150 to 8000 mg/L, preferably 175 to 7500 mg/L, preferably 200 to 7000 mg/L, preferably 210 to 6500 mg/L, preferably 215 to 6300 mg/L, preferably 225 to 6250 mg/L, preferably 230 to 6205 mg/L.

In some embodiments, the method further comprises measuring the ammonia concentration in the landfill leachate; and calculating a volumetric mix ratio of landfill leachate to supplemented seawater. In some embodiments, the volumetric mix ratio is calculated based on a target $Mg:NH_4^+$ ratio in the reaction mixture. In a preferred embodiment, the volumetric mix has a landfill leachate to seawater ratio of 1:1 to 1:100, preferably 1:2.5 to 1:75, preferably 1:5 to 1:50, preferably 1:7.5 to 1:40, preferably 1:10 to 1:30, preferably 1:12.5 to 1:27.5, preferably 1:15 to 1:25, preferably 1:17.5 to 1:22.5, preferably 1:20.

In some embodiments, the method further comprises measuring the phosphate concentration in the landfill leachate. In some embodiments, the measured ammonia concentration and/or the measured phosphate concentration are used to calculate a phosphate supplement amount. The phosphate supplement amount should be sufficient to give the reaction mixture a molar ratio of $Mg^{2+}$ to phosphate and/or a molar ratio of $NH_4^+$ to phosphate as described above.

In some embodiments, the method further comprises adding a second precipitate seed solid to the reaction mixture. The second precipitate seed solid may in general be any suitable salt or compound of phosphate, hydrogenphosphate, dihydrogenphosphate, pyrophosphate, or triphosphate. In some embodiments, the second seed precipitate comprises magnesium ammonium phosphate. Unlike the addition of the oxalic acid and the phosphate supplement, the second precipitate seed solid is not suitable to be added as a solution.

In some embodiments, the method further comprises adding a coagulation aid to the reaction mixture. Examples of coagulation aids include, but are not limited to alum (aluminum sulfate and salts thereof), iron sulfate, iron halides, aluminum chlorohydrate, and polymeric organic coagulants. Examples of polymeric organic coagulants include, but are not limited to anionic coagulants such as sodium polyacrylate, salts of partially hydrolyzed polyacrylamide (e.g. Na, K, etc. salts), salts of maleic acid copolymers, cationic coagulants such as polyvinylpyridine hydrochloride, salts of vinylpyridine copolymers, and nonionic coagulants such as diallyldimethylammonium chloride polymers, polyacrylamide, polyethylene oxide, and polyvinyl alcohol. In some embodiments, the coagulation aid is an iron halide. In a preferred embodiment of the present invention, the iron halide is ferric chloride.

In some embodiments, the amount of coagulation aid added is about 1 to 100 mg/L, preferably 2.5 to 75 mg/L, preferably 5 to 50 mg/L, preferably 7.5 to 45 mg/L, preferably 10 to 40 mg/L, preferably 12.5 to 37.5 mg/L, preferably 15 to 35 mg/L, preferably 17.5 to 32.5 mg/L, preferably 20 to 30 mg/L, preferably 22.5 to 27.5 mg/L, preferably 25 mg/L of reaction mixture.

In another embodiment, the method further comprises adding a precipitation inhibitor to the reaction mixture. The use of a precipitation inhibitor may be advantageous for increasing the size of magnesium ammonium phosphate solids formed during the precipitation. Such larger solids may be easier or more efficiently separated from the treated leachate. Examples of precipitation inhibitors include, but are not limited to Eudragit® S100, Eudragit® E100, poly(ethylene oxide)-b-poly(propylene)-b-poly(ethylene oxide) (Poloxamer) (Pluronic®), poly(ethylene glycol) (PEG), poly(ethylene imine) (PEI), Eudragit® RL100, poly(ether)-co-poly(ol) (PEPO), poly(propylene glycol) (PPG), poly(styrene) sulfonic acid (PSS), poly(vinylpyrrolidone) (PVP), poly(vinyl acetate)-co-poly/vinylpyrrolidone) (PVA-PVP), hydroxyethyl cellulose (HEC), poly(methyl methacrylate) (PMMA), poly(lactic acid) (PLA), poly(vinyl acetate) phthalate (PVAP), hydroxypropyl methyl cellulose acetate succinate (HPMCAS), cellulose acetate phthalate (CAP), hydroxypropyl methyl cellulose (HPMC), poly(vinyl alcohol) (PVOH), poly(acrylic acid) (PAA), poly(acetylene), methyl cellulose, poly(lactid-co-glycolid) (PLGA), sodium carboxymethyl cellulose (SCMC), chitosan, poly(urethane) (PUR), mannitol, poly(glycolide) (PGA), locust bean gum, alginic acid gum, hydroxy propyl-β-cyclodextrin (HPβCD), sulfobutyl ether-β-cyclodextrin (SBEβCD) (Captisol®), sodium dodecyl sulphate (SDS), pEG-40 hydrogenated castor oil (Cremophor®), poly(ethylene glycol) sorbitan monolaurate (Tween® 20), sorbitol, sodium cholate, sodium deoxycholate, sodium chenodeoxycholate, sodium lithocholate, sodium ursodeoxycholate, sodium hyodeoxycholate, sodium taurocholate, sodium glycocholate, sodium glycodeoxycholate, sodium glycochenodeoxycholate, sodium glycoursodeoxycholate, sodium taurodeoxycholate sodium taurochenodeoxycholate, boric acid, and borate salts such as sodium tetraborate. In preferred embodiments, the precipitation inhibitor is boric acid. In some embodiments, the addition of a precipitation inhibitor leads to longer reaction and residence times compared to a method which does not use a precipitation inhibitor.

In some embodiments, the method further comprises contacting the landfill leachate with a cation exchange resin prior to mixing with supplemented seawater. The cation exchange resin may be any suitable cation exchange resin known to one of ordinary skill in the art. Cation exchange resins are typically classified based on the nature of functional groups present in the resin. Strongly acidic (also known as strong acid) cation exchange resins typically comprise sulfonic acid groups. Weakly acidic (also known as weak acid) cation exchange resins typically comprise carboxylic acid functional groups. Chelating resins typically comprise polydentate functional groups suitable for acting as polydentate ligands for binding cations, particularly metal cations, disposed on a support. Examples of such polydentate functional groups include imino- or amino-carboxylic acid groups such as iminodiacetic acid groups, aminophosphinic acid groups, aminophosphonic acid groups, thioureas, and multidentate amine functions groups such as 2-picolylamine groups. These polydentate functional groups may exist in either an acid form or salt form as appropriate. In some embodiments, the cation exchange resin comprises a strong acid ion exchange resin. In some embodiments, the cation exchange resin comprises a weak acid ion exchange resin. In some embodiments, the cation exchange resin comprises a chelating resin.

These functional groups are typically present on a substrate. The substrate may be an inorganic material such as a zeolite, silica, or metal-organic framework, or the like. The substrate may also be a polymer. The polymer may contain a polymer backbone which is substantially free of the acidic functional groups described above, for example polystyrene, polystyrene-divinylbenzene copolymer, polyethylene, polypropylene, polymethylmethacrylate, polymethacrylate, and the like. The polymer may contain a polymer backbone which contains various functional groups such as those described above or other functional groups, for example polyethyleneimine, poly(acrylamido-N-propyltrimethylammonium chloride) (polyAPTAC), poly[(3-(methacryloylamino)-propyl] trimethylammonium chloride) (polyMAPTAC), polyacrylamide, and the like. In some embodiments, the polyolefin is polystyrene.

Such polymer-containing cation exchange resins are typically in the form of polymer beads, the polymer beads being composed of or being coating with a polymer containing the functional groups described above. Such polymer beads may be non-porous or porous. Porous polymer beads may be macroporous, microporous, or both. In some embodiments, the cation exchange resin comprises polymer beads. In some embodiments, the polymer beads are polystyrene beads. In preferred embodiments, the polystyrene beads are cross-linked polystyrene or a polystyrene-divinylbenzene copolymer. In some embodiments, the polymer beads have a mean size of 0.425 to 1.20 mm, preferably 0.450 to 1.150 mm, preferably 0.475 to 1.10 mm, preferably 0.500 to 1.05 mm, preferably 0.525 to 1.00 mm, preferably 0.550 to 0.950 mm, preferably 0.575 to 0.900 mm, preferably 0.600 to 0.875 mm, preferably 0.625 to 0.850 mm, preferably 0.650 to 0.825 mm, preferably 0.675 to 0.800 mm, preferably 0.700 to 0.775 mm, preferably 0.725 to 0.760 mm. Examples of suitable cation exchange resins include, but are not limited to DOWEX®-50WX8 available from Dow, Amberlyst® 15, AmberLite® IRC747 and PWA10, AmberSep® GT75, IRA743, IRC747 UPS, IRC748 UPS, and M4195 UPS, and AmberTec® UP7530 available from DuPont, Purolite® CT269, CT175, MTS9100, MTS 9140, MTS9200, MST9300, MTS9300H, MTS9301, MTS9500, MTS9500H, MTS9501, MTS9510PF, MTS9570, and MTS9600 available from Purolite, Diaion™ CR11, CR21, CRB03, CRB05, CRBT03, and Relite™ JS010 available from Mitusbishi Chemical, and Tulsion® T-6812 and T-2018 from Thermax.

The cation exchange resin may have a cation exchange capacity. The cation exchange capacity refers to a total amount of cations, measured in moles, which may be removed by the cation exchange resin. The action of the cation exchange resin in removing certain cations from the seawater depletes the cation exchange capacity. The resin may be depleted to a point at which it is incapable of acting in the esterification reaction of the resin unit. A resin in which an entirety of the cation exchange resin has been lost may be referred to as a depleted resin or an exhausted resin. A resin which has lost a portion of the cation exchange capacity may be referred to as a partially depleted resin, a partially exhausted resin, or other similar term. A depleted or partially depleted resin may be a resin which is in need of regeneration.

In a preferred embodiment, the contact with the cation exchange resin reduces a metal ion concentration of the landfill leachate by at least 50%, preferably at least 55%, preferably at least 60%, preferably at least 65%, preferably at least 70%, preferably at least 75%, preferably at least 80%, preferably at least 85%, preferably at least 90%, preferably at least 95% of an initial metal ion concentration. In some embodiments, said metal ion is at least one selected from the group consisting of manganese, calcium, cadmium, zinc, and iron.

In a preferred embodiment of the present invention as described above, the landfill leachate is contacted with the cation exchange resin in an amount of 0.01 to 1 g, preferably 0.05 to 0.9 g, preferably 0.1 to 0.8 g, preferably 0.25 to 0.75 g, preferably 0.3 to 0.7 g, preferably 0.35 to 0.65 g, preferably 0.4 to 0.6 g, preferably 0.45 to 0.55 g, preferably 0.475 to 0.525 g, preferably 0.5 g cation exchange resin per mL of landfill leachate.

In some embodiments, the magnesium ammonium phosphate is amorphous by PXRD. In some embodiments, the magnesium ammonium phosphate is crystalline by PXRD. In some embodiments, the magnesium ammonium phosphate has a particle size of 0.05 to 10 mm, preferably 0.1 to 7.5 mm, preferably 0.25 to 6 mm, preferably 0.5 to 5 mm, preferably 1 to 4.5 mm. Solid magnesium ammonium phosphate having a particle size below 0.05 mm may be difficult to separate from the treated leachate or be unsuitable for use as a fertilizer due to fast dissolution. Thus, such solids are disadvantageous to form. In some embodiments, the magnesium ammonium phosphate is in the form of particles having a prism-like morphology. Such prism-like particles may have a rectangular cross-section. In some embodiments, the magnesium ammonium phosphate is in the form of particles having a needle-like morphology. In some embodiments, the needle-like particles are agglomerated to form collections of particles having a "snowball" or stellated appearance in which the needle-like crystals are oriented in a direction radially outward from a collection center.

In some embodiments, method removes at least 90%, preferably at least 91%, preferably at least 92%, preferably at least 93%, preferably at least 94%, preferably at least 95%, preferably at least 96%, preferably at least 97%, preferably at least 98%, preferably at least 99% of an initial number of moles of ammoniacal nitrogen present in the landfill leachate. In some embodiments, the method reduces the ADMI color index of the landfill leachate treated by the method by at least 90%, preferably at least 91%, preferably at least 92%, preferably at least 93%, preferably at least 94%, preferably at least 95%, preferably at least 96%, preferably at least 97%, preferably at least 98%, preferably at least 99%, based on an initial ADMI color index of the landfill leachate. That is, the treated leachate has an ADMI color index which is less than 10%, preferably less than 9%, preferably less than 8%, preferably less than 7%, preferably less than 6%, preferably less than 5%, preferably less than 4%, preferably less than 3%, preferably less than 2%, preferably less than 1% of an initial ADMI color index of the landfill leachate.

In some embodiments, the method reduces a turbidity of the landfill leachate treated by the method by at least 90%, preferably at least 91%, preferably at least 92%, preferably at least 93%, preferably at least 94%, preferably at least 95%, preferably at least 96%, preferably at least 97%, preferably at least 98%, preferably at least 99%, based on an initial turbidity of the landfill leachate. That is, the treated leachate has a turbidity which is less than 10%, preferably less than 9%, preferably less than 8%, preferably less than 7%, preferably less than 6%, preferably less than 5%, preferably less than 4%, preferably less than 3%, preferably less than 2%, preferably less than 1% of an initial turbidity of the landfill leachate.

In some embodiments, the method reduces a chemical oxygen demand of the landfill leachate treated by the method by at least 40%, preferably at least 42.5%, preferably at least 45%, preferably at least 47.5%, preferably at least 50%, preferably at least 52.5%, preferably at least 55%, preferably at least 57.5%, preferably at least 60%, preferably at least 62.5%, preferably at least 65%, preferably at least 67.5%, preferably at least 70%, preferably at least 72.5%, preferably at least 75%, preferably at least 77.5%, preferably at least 80%, preferably at least 82.5%, preferably at least 85%, preferably at least 87.5%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99%, based on an initial chemical oxygen demand of the landfill leachate. That is, the treated leachate has a chemical oxygen demand which is less than 60%, preferably less than 57.5%, preferably less than 55%, preferably less than 52.5%, preferably less than 50%, preferably less than 47.5%, preferably less than 45%, preferably less than 42.5%, preferably less than 40%, preferably less than 37.5%, preferably less than 35%, preferably less than 32.5%, preferably less than 30%, preferably less than 27.5%, preferably less than 25%, preferably less than 22.5%, preferably less than 20%, preferably less than 17.5%, preferably less than 15%, preferably less than 12.5%, preferably less than 10%, preferably less than 9%, preferably less than 8%, preferably less than 7%, preferably less than 6%, preferably less than 5%, preferably less than 4%, preferably less than 3%, preferably less than 2%, preferably less than 1% of an initial chemical oxygen demand of the landfill leachate.

In some embodiments, the aging is performed for 10 to 120 minutes, preferably 20 to 90 minutes, preferably 30 to 85 minutes, preferably 40 to 80 minutes, preferably 45 to 75 minutes, preferably 50 to 70 minutes, preferably 55 to 65 minutes, preferably 60 minutes. In some embodiments, the aging is performed with stirring. In some embodiments, the aging is performed at 20 to 50° C., preferably 25 to 45° C., preferably 30 to 40° C.

Examples

Material Selection

The location for data collection was located at Sungai Ikan Kuala Terengganu. The landfill has an area of 34.50 ha and receives about 3000 tons of waste per day. The seawater sampling was collected at the local seashore near to the University Malaysia Terengganu.

Sample Analysis

Identification of the magnesium contained in seawater was performed using Atomic Absorption Spectrophotometer. The phosphorus and ammonium content in the leachate was determined by Standard Method (APHA 2005).

Experimental Setup

Prior to batch experiments, the pH was adjusted using small amounts of acid (HCl) or base (NaOH) to achieve the desire pH conditions. The experimental set was designed following 2-level Fractional Factorial Design using Design Expert 8.0 software. The design of the experiment made up of 80 individual batch samples comprises of evaluating the treatment performance for 8 variables (5 numerical variables: pH, time, molar ratio, temperature, and stirring speed along with 3 nominal variables: phosphorus supplement, calcium interference, and coagulant aid). The values selected for each variable depending on the conditions for successful struvite precipitation especially for the pH value and on the molar ratio of $Mg:NH_4$. A higher volume of seawater was employed in each batch test since the amount of magnesium ions naturally available in seawater was quite low compared to the high concentration of ammoniacal nitrogen. Therefore, the removal efficiency from the experiments was also assumed to occur due to the dilution effect and being considered in the discussion of the treatment removal efficiency. Table 1 below summarized on the scale of variables used for the batch experiments.

TABLE 1

Summary of Batch Experimental Variables

| Factor | Name | Minimum | Maximum |
|---|---|---|---|
| A | pH | 7.00 | 11.00 |
| B | Time (minute) | 20.00 | 60.00 |
| C | Molar Ration ($Mg:NH_4$) | 1.50 | 3.00 |
| D | Temperature (° C.) | 30.00 | 40.00 |
| E | Stirring Speed (rpm) | 50 | 150 |
| F | Phosphorus Source | Without | With |
| G | Calcium Interference | Removed | Raw |
| H | Coagulant Aid | None | Added |

For all those experiments, 10 responses were determined for the major leachate parameters such as temp, pH, ammoniacal nitrogen, orthophosphate, COD, color, turbidity, and heavy metals (Mg, Fe, Zn). At the end of each batch experiments, the solution mixture and solid sludge were separated by filtration through Whatman GF/C filter paper 0.45 μm. The low solubility of struvite enables easy and complete separation from the mixture (Di Iaconi et al., 2010). The supernatant was tested for all the major leachate pollutant parameters whereas the solid sludges were dried and weighed.

Analytical Methods

Ammoniacal nitrogen (AN), chemical oxygen demand (COD), heavy metals, orthophosphate, pH, and temperature were determined according to standard methods (Apha, 1999) and the color was measured using ADMI color value which is the standard used for leachate discharge limit in Malaysia. The values of pH and temperature were taken using YSI Multiparameter Professional Plus while turbidity was measured using Thermo Scientific Orion AQ3010 Aquafast Turbidity Meter. Ammoniacal nitrogen, chemical oxygen demand, and orthophosphate were measured using HACH DR 2800 spectrophotometer, and the color was determined using Shimadzu UV-VIS spectrophotometer (UV1800).

Heavy metals determination was performed using atomic absorption spectroscopy (Varian SpectrAA 220FS) for the measurement of iron (Fe), magnesium (Mg), and zinc (Zn). The system consists of four lamp positions for multiple elements analysis using a rotating mirror to select the operating lamp and high-density deuterium background correction as standard. Five mixtures of the standard solution in series were used for calibration of the system.

Results

In experiments performed according to teachings of the present invention, ten responses were determined for the major leachate parameters such as temp, pH, ammoniacal nitrogen, orthophosphate, COD, color, turbidity, and heavy metals (Mg, Fe, Zn). At the end of each batch experiment, the solution mixture and solid sludge were separated by filtration through Whatman GF/C filter paper 0.45 The low solubility of struvite enabled easy and complete separation from the mixture. The supernatant was tested for all the major leachate pollutant parameters whereas the solid sludges were dried and weighed.

The treatment was not only effective in recovering ammonia and phosphate but also treated the leachate for color, turbidity and COD value. Even the lowest variables managed to remove more than 96% of the ammoniacal nitrogen. The amount of COD and magnesium was an average of 20% and 57.6%, respectively. COD removal can be increased to 80% by doubling the molar ratio (3.00) and maximizing stirring speed (150 rpm) but magnesium removal would remain at about 52%. Highest magnesium recovery (77%) could be achieved by increasing the pH value to 11 and maximizing the stirrer speed while retaining the molar ratio at the lowest point. Summary of the overall removal efficiency compared to the leachate discharge standard is given in Table 2.

calcium precipitation. A mole ratio of $H^+$/Phosphorus of 3.0 is required for successful phosphate extraction by conversion to phosphoric acid. This concentration of oxalic acid provides a molar ratio of up to 8.8 for excessive $H^+$ ion during the actual leaching process based on measures of unavailable phosphate in the leachate. It also provides an excess of oxalate anions to precipitate with calcium and thus removes calcium interference as calcium oxalate precipitate. This calcium is then unable to form undesirable precipitates that reduce the phosphate concentration such as calcium phosphate or calcium ammonium phosphate.

For the boric acid precipitation inhibitor, the formation of struvite is retarded because the addition of boric acid will slow down the deposition of MgO, MgOH, or other magnesium-containing materials, making more magnesium ion available to interact with ammonia and phosphate. Further, the boric acid may reversibly interact with various components of the reaction mixture, decreasing the instantaneous concentration of those components. The smaller available concentration lowers the probability of nucleating new crystals, favoring growth on existing crystals. This leads to the production of a much better, bigger, and stable struvite crystal.

The invention claimed is:

1. A method of removing ammoniacal nitrogen from a landfill leachate, the method comprising:
    adding oxalic acid to seawater to form a depletion solution having an oxalic acid concentration of 0.01 to 0.25 M;
    precipitating, from the depletion solution, a first precipitate comprising calcium oxalate to form a depleted seawater;
    adding a phosphate source to the depleted seawater to form a supplemented seawater;
    mixing the supplemented seawater with a landfill leachate having an ammoniacal nitrogen content of 100 to 10,000 mg/L to form a reaction mixture having a molar ratio of $Mg^{2+}$ to $NH^{4+}$ of 1:1 to 1:5;
    adding a precipitation inhibitor to the reaction mixture;
    adjusting the pH of the reaction mixture to 7.5 to 11.0 to form an adjusted reaction mixture;

TABLE 2

Treated leachate characteristics and removal efficiency in comparison to leachate discharge standard.

| Parameter | Diluted Leachate** | Treated Samples (Leachate Seawater: 80 samples) | % Removal Efficiency | | | Leachate Discharge Standard*** |
|---|---|---|---|---|---|---|
| | | | Minimum | Maximum | Mean | |
| COD (mg/L) | 611-1095 | 15-3860 | 11 | 99 | 58.99 | 400 |
| Ammoniacal Nitrogen (mg/L) | 11.55-310.08 | 2.3-186.0 | 97 | 99 | 98.85 | 5 |
| Phosphate (mg/L) | 0.85-1.60 | 0.17-3.84 | 88 | 99 | 96.39 | NA* |
| Color (ADMI)* | 350.0-380.8 | 4.83-49.00 | 93 | 99 | 97.54 | 100 |
| Turbidity (NTU) | 32.85-37.52 | 0-44.04 | 40 | 100 | 98.40 | NA* |
| Mg (mg/L) | 12.01-12.61 | 0.27-0.84 | 29 | 77 | 57.10 | NA* |
| Fe (mg/L) | 0.67 | 0.01-0.33 | 43 | 98 | 65.74 | 5.0 |
| Zn (mg/L) | 0.09 | 0.0027-0.0003 | 10 | 89 | 57.44 | 2.0 |

*ADMI = American Dye Manufacture Institute; NA = Not Applicable
**Estimate based on leachate and seawater initial compositions and 1:20 ratio (by volume) of leachate:seawater
***Environmental Quality Act 1974. Environmental Quality (Control of Pollution from Solid Water Transfer Station and Landfill) Regulations 2009. Second schedule (Regulation 13).

For the oxalic acid calcium removal, 0.05 M is effective for the purposes of the method since it provides both $H^+$ ions for phosphorous leeching as well as oxalate anions for aging, for 10 to 120 minutes, the adjusted reaction mixture to form a treated leachate and a second precipitate comprising magnesium ammonium phosphate; and separating the second precipitate and the treated leachate, wherein the second precipitate is substantially free of calcium.

2. The method of claim 1, further comprising removing the first precipitate from the depleted seawater.

3. The method of claim 1, further comprising:
measuring the ammonia concentration in the landfill leachate; and
calculating a volumetric mix ratio of landfill leachate to supplemented seawater.

4. The method of claim 1, further comprising:
adding a second precipitate seed solid to the reaction mixture.

5. The method of claim 4, wherein the second precipitate seed solid comprises magnesium ammonium phosphate.

6. The method of claim 1, further comprising:
adding a coagulation aid to the reaction mixture.

7. The method of claim 6, wherein the coagulation aid is an iron halide.

8. The method of claim 7, wherein the iron halide is ferric chloride.

9. The method of claim 1, wherein the precipitation inhibitor is boric acid.

10. The method of claim 1, further comprising:
contacting the landfill leachate with a cation exchange resin prior to mixing with supplemented seawater.

11. The method of claim 10, wherein the contact with the cation exchange resin reduces a metal ion concentration of the landfill leachate by at least 50% of an initial metal ion concentration.

12. The method of claim 11, wherein the metal ion is at least one selected from the group consisting of manganese, calcium, cadmium, zinc, and iron.

13. The method of claim 10, wherein the landfill leachate is contacted with the cation exchange resin in an amount of 0.01 to 1 g cation exchange resin per mL of landfill leachate.

14. The method of claim 1, which removes at least 90% of an initial amount of ammoniacal nitrogen present in the landfill leachate.

15. The method of claim 1, wherein the aging is performed for 20 to 90 minutes.

16. The method of claim 1, wherein the aging is performed with stirring.

17. The method of claim 1, wherein the aging is performed at 20 to 50° C.

18. The method of claim 1, further comprising, prior to the mixing, demethanizing the landfill leachate.

\* \* \* \* \*